M. V. LONGSWORTH.

Harness-Pads.

No. 8,418. Reissued Sept. 17, 1878.

WITNESSES

E. H. Bates

F. J. Masi

INVENTOR

Miron V. Longsworth by E. W. Anderson

ATTORNEY

N. PETERS, PHOTO-LITHOGRAPHER, WASHINGTON, D. C.

UNITED STATES PATENT OFFICE.

MIRON V. LONGSWORTH, OF DELPHOS, OHIO.

IMPROVEMENT IN HARNESS-PADS.

Specification forming part of Letters Patent No. 179,930, dated July 18, 1876; Reissue No. 8,418, dated September 17, 1878; application filed April 6, 1878.

*To all whom it may concern:*

Be it known that I, MIRON V. LONGSWORTH, of Delphos, in the county of Allen and State of Ohio, have invented certain new and useful Improvements in Harness-Pads; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
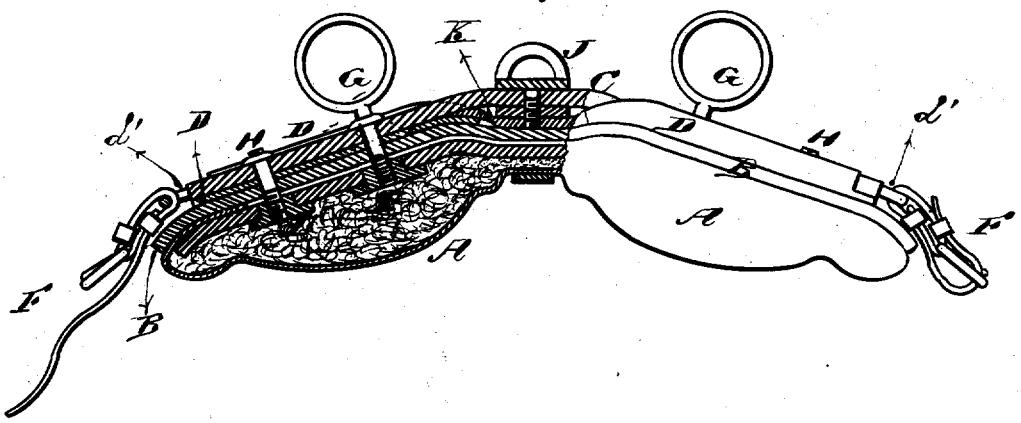
Figure 2:
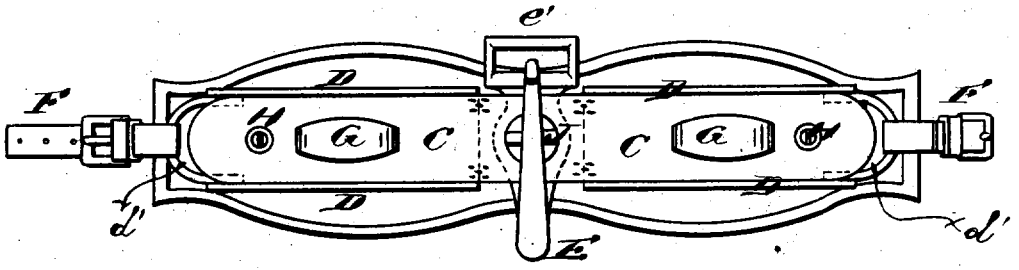

Figure 1 is a longitudinal section of a harness-pad having my improvement applied. Fig. 2 is a top view of the same.

Similar letters of reference indicate corresponding parts.

The object of this invention is to save labor and lessen cost in making harness-pads, while at the same time producing neat, strong, and durable pads having some flexibility between the branches.

This invention consists in the construction and novel arrangement of a harness-pad with independent side plates and leather back plate or connection between said side plates and the pad-cushions, these parts being connected by suitable screws.

It also consists in the combination, with the terrets and connecting-screws, of the upwardly-flanged plates, having end loops forming part of said plates; and, finally, it consists in the short bridge-strap beneath the base of the water-hook, whereby the center of the saddle is re-enforced, all as hereinafter shown and described.

A represents the cushion of the pad, finished independently and provided with internally-flanged nuts I, which are placed in the back of said pad and secured beneath the same. Above this pad-cushion is placed the leather plate B, which is of thick leather and of sufficient width to give the pad its required stability and strength. C represents the upper or saddle strap. D D indicate two metal side plates interposed between the saddle-strap C and the leather plate B, and extending from the lower end of said leather plate, or from near said lower end, nearly to the water-hook E.

The side edges of the plates D may be bent upward at the side edges of the strap C to aid in keeping said strap in position.

To the lower ends of the plates D are attached, or upon them are formed, loops or rings *d'*, to which are connected the straps F, with which the belly-band straps and the straps that support the traces are connected, so that the movements of the traces cannot cause the pad to work upon and chafe the horse's back. The metal plates D are secured in place by the terrets G and the screws H, which pass through the strap C, the metal plates D, the leather plate B, and the back of the pad A, and screw into the nuts I.

The water-hook E is secured by a screw, J, to the center of the strap C, which is strengthened by a short bridge-strap, K, placed beneath the base of the water-hook and extending on each side thereof, its ends being secured to said strap C by a few stitches. Upon the rear end of the base of the water-hook E is formed the loop *e'* to receive the back-strap.

Having thus described my invention, what I claim as new, and desire to secure by Letters Patent, is—

1. The combination, with terrets G and screws H, of the upwardly-flanged plates, having end loops forming a part thereof, substantially as specified.

2. The harness-pad having independent metallic side plates D and leather back-plate B under and connecting the same, the parts being secured together and to the cushion by the terrets and screws, substantially as specified.

3. In a harness-pad having independent metallic side plates and leather connecting-plate below the same, the short bridge-strap K, re-enforcing the saddle-strap, and placed beneath the base of the water-hook and over the upper ends of said side plates, substantially as specified.

In testimony that I claim the foregoing I have hereunto set my hand this 26th day of March, 1878.

MIRON V. LONGSWORTH.

Witnesses:

HORACE A. REEVE,

JAMES K. REEVE.